(12) United States Patent
Sun (10) Patent No.: US 11,054,977 B2
(45) Date of Patent: Jul. 6, 2021

(54) DEVICES, METHODS, AND COMPUTER PROGRAM FOR DISPLAYING USER INTERFACES

(71) Applicant: Samsung Electronics Co., Ltd, Suwon-si (KR)

(72) Inventor: Jianbing Sun, Tianjin (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/289,586

(22) Filed: Feb. 28, 2019

(65) Prior Publication Data

US 2019/0272086 A1 Sep. 5, 2019

(30) Foreign Application Priority Data

Mar. 1, 2018 (CN) .......................... 201810171328.8

(51) Int. Cl.
*G06F 3/0484* (2013.01)
*G06F 3/0482* (2013.01)
*G06F 9/451* (2018.01)
*G06F 3/0483* (2013.01)

(52) U.S. Cl.
CPC ........ *G06F 3/04847* (2013.01); *G06F 3/0482* (2013.01); *G06F 3/0483* (2013.01); *G06F 9/451* (2018.02); *G06F 3/04842* (2013.01); *G06F 2203/04804* (2013.01)

(58) Field of Classification Search
CPC ................................................. G06F 3/04847
USPC ....................................................... 715/767
See application file for complete search history.

(56) References Cited

U.S. PATENT DOCUMENTS

| 8,775,965 | B1* | 7/2014 | Kuscher | G06F 16/95 |
| 9,996,249 | B2* | 6/2018 | Park | G06F 3/0488 |
| 2007/0171286 | A1* | 7/2007 | Ishii | H04N 5/272 |
| | | | | 348/239 |
| 2012/0071208 | A1* | 3/2012 | Lee | G06F 3/04842 |
| | | | | 455/566 |
| 2012/0299968 | A1* | 11/2012 | Wong | G06F 3/04883 |
| | | | | 345/661 |

(Continued)

FOREIGN PATENT DOCUMENTS

| KR | 10-1169648 B1 | 7/2012 |
| KR | 10-2014-0030850 A | 3/2014 |

(Continued)

OTHER PUBLICATIONS

"Simple Way to Turn Your Xiaomi Phones Into Transparent Screen", stiwe, Oct. 10, 2017, 7 pages.

(Continued)

*Primary Examiner* — Reza Nabi (57) ABSTRACT

An electronic device is provided. The electronic device includes a memory storing instructions and at least one processor configured to execute the instructions. A home screen is displayed on a screen of the electronic device. In response to receiving a first user interaction for a first application of the electronic device, the first application is executed in the electronic device. A first user interface of the first application is displayed by superimposing the home screen on the first user interface, and the first user interface is visible through the home screen on the screen of the electronic device.

16 Claims, 10 Drawing Sheets

(56) References Cited

U.S. PATENT DOCUMENTS

| | | | | |
|---|---|---|---|---|
| 2012/0304114 A1* | 11/2012 | Wong | G06F 3/0481 | 715/800 |
| 2012/0304132 A1* | 11/2012 | Sareen | G06F 3/04883 | 715/863 |
| 2012/0304133 A1* | 11/2012 | Nan | G06F 3/04883 | 715/863 |
| 2013/0135235 A1 | 5/2013 | Noutomi | | |
| 2013/0219343 A1* | 8/2013 | Nan | G06F 3/0486 | 715/838 |
| 2013/0321401 A1* | 12/2013 | Piemonte | G06T 19/20 | 345/419 |
| 2013/0321461 A1* | 12/2013 | Filip | G06F 16/954 | 345/632 |
| 2013/0322702 A1* | 12/2013 | Piemonte | G06T 15/005 | 382/113 |
| 2014/0164988 A1* | 6/2014 | Barnett | G06F 3/0481 | 715/790 |
| 2014/0184530 A1* | 7/2014 | Hyun | G06F 1/1643 | 345/173 |
| 2014/0372938 A1 | 12/2014 | Park | | |
| 2015/0058754 A1* | 2/2015 | Rauh | H04L 65/403 | 715/753 |
| 2016/0209994 A1* | 7/2016 | Kaufthal | G06F 8/38 | |
| 2016/0309090 A1 | 10/2016 | Park et al. | | |
| 2017/0068428 A1* | 3/2017 | Wong | G06F 3/04845 | |
| 2017/0228857 A1* | 8/2017 | Carmi | G06T 5/50 | |
| 2018/0182172 A1* | 6/2018 | Vinmani | G06F 3/011 | |
| 2018/0204386 A1* | 7/2018 | Chen | G06F 3/0346 | |
| 2019/0080673 A1* | 3/2019 | Li | G09G 3/20 | |
| 2019/0272086 A1* | 9/2019 | Sun | G06F 3/0483 | |

FOREIGN PATENT DOCUMENTS

| | | |
|---|---|---|
| KR | 10-2014-0145894 A | 12/2014 |
| KR | 10-1750542 B1 | 6/2017 |
| KR | 10-1980704 B1 | 5/2019 |
| WO | 2015/192085 A2 | 12/2015 |

OTHER PUBLICATIONS

Notification of Transmittal of the International Search Report and The Written Opinion of the International Searching Authority, or the Declaration dated May 30, 2019 in connection with International Patent Application No. PCT/KR2019/002445, 10 pages.

Supplementary European Search Report dated Jan. 28, 2021 in connection with European Patent Application No. 19 76 0007, 10 pages.

* cited by examiner

DEVICES, METHODS, AND COMPUTER PROGRAM FOR DISPLAYING USER INTERFACES

CROSS-REFERENCE TO RELATED APPLICATION

This application is based on and claims priority under 35 U.S.C. § 119 to Chinese Patent Application No. 201810171328.8 filed on Mar. 1, 2018 in the Chinese Patent Office, the disclosure of which is incorporated by reference herein in its entirety.

BACKGROUND

1. Field

The disclosure relates to a field of an electronic terminal, specifically, to methods, devices, and computer programs for displaying a user interface of an application.

2. Description of the Related Art

With the development of electronic technology, the number of applications installed in electronic terminals (for example, mobile communication terminals, tablet computers, etc.) increases to meet various needs. Generally, if user interfaces of multiple applications need to be displayed at the same time, the user interfaces may be simultaneously displayed by multiple windows or by using a split screen display mode. However, these methods may make an area in which each user interface is displayed smaller than its original size. Thus, it is not preferable for an electronic terminal having a small screen size.

SUMMARY

It is an aspect to address at least the above-mentioned problems and/or disadvantages and to provide at least the advantages described below.

According to an embodiment, there is provided an electronic device including: a memory storing instructions; and at least one processor configured to execute the instructions to: display a home screen on a screen of the electronic device; in response to receiving a first user interaction for a first application of the electronic device, execute the first application in the electronic device; and display a first user interface of the first application by superimposing the home screen on the first user interface, wherein the first user interface is visible through the home screen on the screen of the electronic device.

According to an embodiment, the at least one processor is further configured to execute the instructions to: in response to receiving a second user interaction for a second application, execute the second application of the electronic device in the electronic device; and display a second user interface of the second application by superimposing the second user interface on the first user interface, wherein the first user interface is visible through the second user interface on the screen of the electronic device.

According to an embodiment, the second user interface is transparently displayed.

According to an embodiment, the second user interface is transparently displayed by setting overall transparency of the second user interface to have a preset value.

According to an embodiment, the second user interface is transparently displayed by setting transparency of a first object in the second user interface to have a first preset value, and setting transparency of a second object of the second user interface to have a second preset value, wherein the first object and the second object are different from each other.

According to an embodiment, the second user interface is transparently displayed by setting transparency of a background of the second user interface to have a preset value.

According to an embodiment, the first user interface is displayed in an area on the screen of the electronic device, and the second user interface is displayed in the same area.

According to an embodiment, at least one object for the first user interface is displayed on the superimposed home screen to be interactable.

According to an embodiment, the first application is a camera application, and the at least one object of the first user interface includes a capture button.

According to an embodiment, the first application is a media player application, and the at least one object of the first user interface includes a media control button.

According to an embodiment, the first user interaction includes: selection of a toggle button of an immersive mode of the first application.

According to an embodiment, the first user interface or the home screen includes the toggle button.

According to an embodiment, the first user interaction includes at least one of selection of an option displayed in the home screen to execute the first application, and selection of an option displayed in the first application to move to the home screen.

According to an embodiment, the first user interface of the first application is displayed as a background of the home screen.

According to an embodiment, the home screen includes a plurality of pages and the first user interface of the first application is visible through the home screen while navigating the plurality of pages of the home screen.

According to an embodiment, the first user interface of the first application is displayed fixedly while the plurality of pages of the home screen are displayed in rotation.

According to an embodiment, the at least one processor is further configured to execute the instructions to update and display contents in the first user interface of the first application.

According to an embodiment, contents are played in the first user interface of the first application.

According to an embodiment, there is provided a method including: displaying a home screen on a screen of the electronic device; in response to receiving a first user interaction for a first application of the electronic device, executing the first application in the electronic device; and displaying a first user interface of the first application by superimposing the home screen on the first user interface, wherein the first user interface is visible through the home screen on the screen of the electronic device.

According to an embodiment, there is provided a non-transitory computer readable recording medium having stored thereon instructions, which when executed, cause at least one processor to carry out the method.

According to an embodiment, there is provided a method and apparatus for displaying a user interface of an application, which is capable of superimposing two user interfaces and transparently displaying a user interface of a top layer so that contents of a user interface of a bottom layer can be displayed.

According to an embodiment, there is provided a method of displaying a user interface of an application, wherein the method includes: receiving a user interaction for performing immersive display of a first user interface; performing the immersive display of the first user interface in response to the user interaction, wherein when performing the immersive display of the first user interface, the first user interface and a second user interface are displayed in a superimposing manner, wherein the first user interface is a bottom layer and the second user interface is a top layer, and the second user interface is transparently displayed such that contents of the first user interface is visible.

According to an embodiment, the second user interface is transparently displayed by: setting overall transparency of the second user interface to have a first preset value; setting transparency of a predetermined control of the second user interfaces to have a second preset value, and setting transparency of a portion of the second user interface other than the predetermined control to have a third preset value; or removing a wallpaper of the second user when the second user interface includes the wallpaper.

According to an embodiment, when performing the immersive display of the first user interface, an area for displaying the first user interface is identical to an area for displaying the second user interface.

According to an embodiment, the second user interface is a currently active user interface.

According to an embodiment, the performing the immersive display of the first user interface includes: if the first user interface is active when the user interaction is received, making a home screen or a last active user interface except for user interfaces of an application to which the first user interface belongs active, and the immersive display of the first user interface is performed.

According to an embodiment, when performing the immersive display of the first user interface, displaying at least a part of controls of the first user interface in a floating manner.

According to an embodiment, the user interaction for performing the immersive display of the first user interface includes: a user interaction for opening an application to which the first user interface belongs in an immersive mode; and/or, a user interaction for performing the immersive display of the first user interface which is active.

According to an embodiment, the method further includes: when a user interaction for quitting of the immersive display of the first user interface is received, displaying the first user interface in a normal manner, and/or displaying the second user interface in a normal manner.

According to an embodiment, there is provided an apparatus of displaying a user interface of an application, wherein the apparatus includes: an interaction receiving unit for receiving a user interaction for performing immersive display of a first user interface; and an immersive mode displaying unit for performing the immersive display of the first user interface in response to the user interaction, wherein when performing the immersive display of the first user interface, the first user interface and a second user interface are displayed in a superimposing manner, wherein the first user interface is a bottom layer and the second user interface is a top layer, and the second user interface is transparently displayed such that contents of the first user interface is visible.

According to an embodiment, the second user interface is transparently displayed by: setting overall transparency of the second user interface to have a first preset value; setting transparency of a predetermined control of the second user interfaces to have a second preset value, and setting transparency of a portion of the second user interface other than the predetermined control to have a third preset value; or removing a wallpaper of the second user when the second user interface includes the wallpaper.

According to an embodiment, when performing the immersive display of the first user interface, an area for displaying the first user interface is identical to an area for displaying the second user interface.

According to an embodiment, the second user interface is a currently active user interface.

According to an embodiment, if the first user interface is active when the user interaction is received, the immersive mode displaying unit makes a home screen or a last active user interface except for user interfaces of an application to which the first user interface belongs active, and the immersive display of the first user interface is performed.

According to an embodiment, when performing the immersive display of the first user interface, the immersive mode displaying unit displays at least a part of controls of the first user interface in a floating manner.

According to an embodiment, the user interaction for performing the immersive display of the first user interface includes: a user interaction for opening an application to which the first user interface belongs in an immersive mode; and/or, a user interaction for performing the immersive display of the first user interface which is active.

According to an embodiment, when a user interaction for quitting of the immersive display of the first user interface is received, the immersive mode displaying unit displays the first user interface in a normal manner, and/or displaying the second user interface in a normal manner.

According to an embodiment, there is provided a computer readable storage medium storing a computer program, wherein the method described above is carried out when the computer program is executed by a processor.

According to another embodiment, there is provided an electronic terminal, wherein the electronic terminal includes: a processor; and a storage storing a computer program, wherein the method described above carried out when the computer program is executed by the processor.

According to another embodiment, two user interfaces may be displayed in a superimposing manner, and a user can see contents of a user interface displayed at a bottom layer through a user interface displayed at a top layer. Therefore, contents of the two user interfaces are visible at the same time, and a display size of each user interface can increase.

Additional aspects and/or advantages of the general inventive concept will be set forth in part in the description, and some will be clear by description or can be learned by implementation of the overall concept of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. The following description includes various specific details to assist in that understanding but these are to be regarded as merely exemplary. Accordingly, those of ordinary skill in the art will recognize that various changes and modifications of the various embodiments described herein may be made without departing from the scope of the disclosure as defined in the appended claims. In addition, descriptions of well-known functions and constructions may be omitted for clarity and conciseness.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those specific details that are pertinent to understanding the embodiments of the disclosure so as not to obscure the drawings with details that will be readily apparent to those of ordinary skill in the art having benefit of the description herein.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Additionally, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

The term "unit", "manager", "engine", or "device" may refer to a unit which processes at least one function or operation and may be implemented by hardware, software, or a combination of hardware and software.

Figure 1:
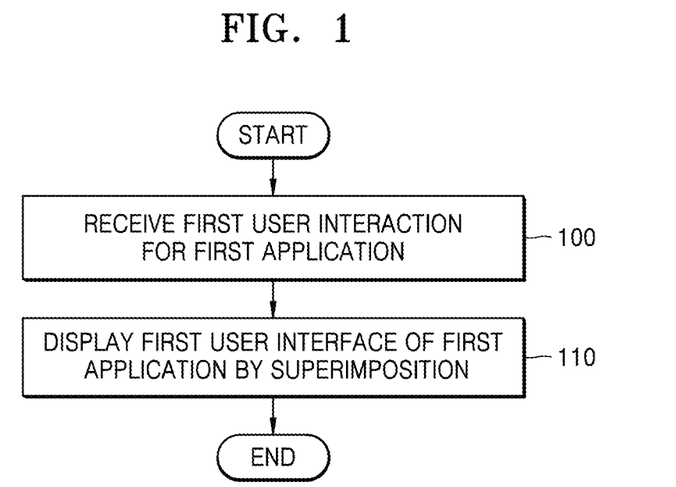
FIG. 1 illustrates a flowchart of a method of displaying a user interface of an application, according to an embodiment of the disclosure.

FIG. 1 illustrates a flowchart of a method of displaying a user interface of an application, according to an embodiment of the disclosure.

Referring to FIG. 1, at Operation 100, a user interaction for a first user interface may be received at an electronic device. Here, the first user interface is a user interface of an application (hereinafter, referred to as a first application), and user interaction for the first user interface may be referred to as a first user interaction As an example, the first user interaction may include opening the first application in an immersive mode. When the first application has not been running in the electronic device, the first user interface may be a main interface of the first application. When the first application has been running in the background of the electronic device, the first user interface may be a user interface that has been displayed by the first application or a last displayed user interface of the first application.

Figure 2:
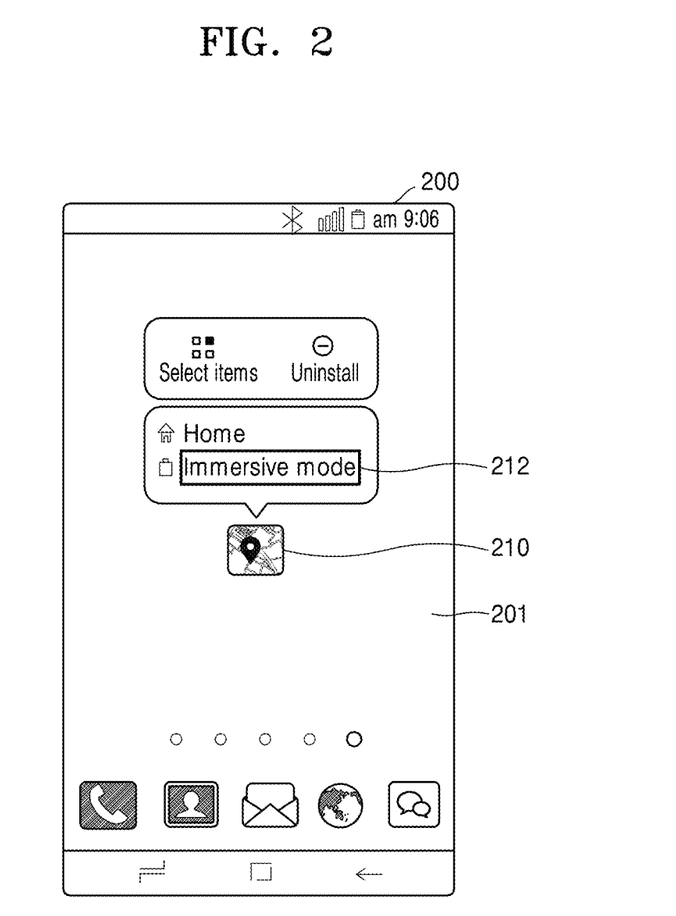
FIGS. 2 and 3 illustrate examples of user interactions for displaying a first user interface, according to an embodiment of the disclosure.
Figure 3:
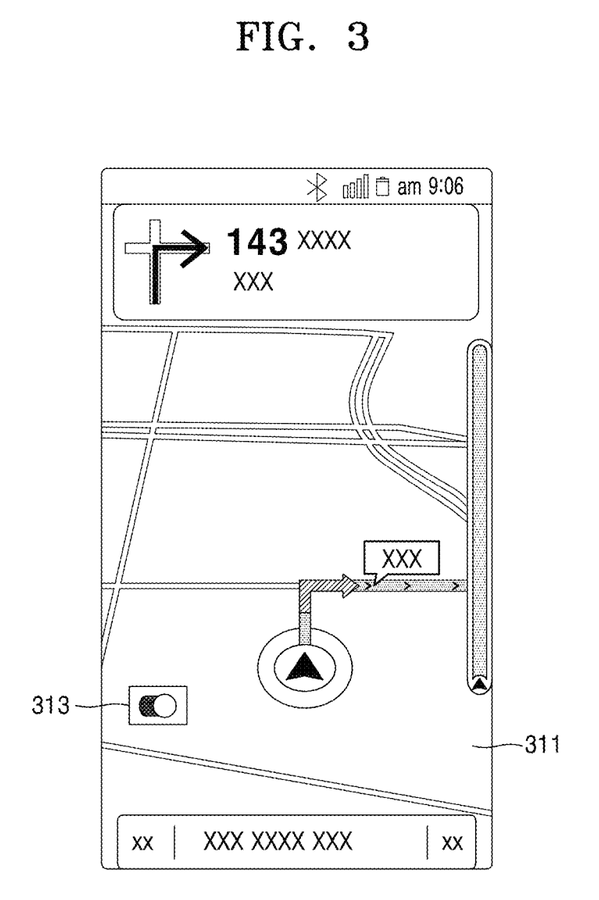

Examples of the first user interaction are explained by referring to FIGS. 2 and 3. FIGS. 2 and 3 illustrate examples of user interactions for displaying a first user interface, that is, the first user interaction, according to an embodiment of the disclosure.

As an example, the first user interaction may be a voice interaction, a touch interaction, a gesture interaction, or the like. For example, the first application may be opened in the immersive mode based on selecting an icon of the first application. For example, as shown in FIG. 2, the first application may be opened in the immersive mode by pressing and holding an icon 210 of the first application, and selecting "Immersive mode" option 212 from a pop-up list. The icon 210 of the first application may be displayed in a home screen 200, and the home screen 200 may be displayed with a wallpaper 201. Upon selection of the option 212 of "Immersive mode", the first application may be executed.

As another example, the first user interaction may include: selection of an option displayed in the first application. That is, the first application is running in the foreground of the electronic device, and the option displayed in the first application may be selected to execute the first application in the immersive mode.

As an example, the first user interaction may be a voice interaction, a touch interaction, a gesture interaction, a key interaction, or the like. For example, as shown in FIG. 3, the first user interaction may be: turning on a toggle button 313 of the immersive mode. The toggle button 313 may float over the active first user interface 311 such that the toggle button 313 is interactable with a user of the electronic device.

In addition, it should be understood that the first user interaction for the first application is not limited thereto, and may also include other suitable interactions.

At Operation 110, the first user interface of the first application may be displayed by superimposition on a screen of the electronic device. For example, a home screen of the electronic device may superimpose on the first user interface, and the first user interface may be displayed through the home screen such that the first user interface is visible through the home screen on the screen of the electronic device. According to an embodiment, when the home screen superimposes on the first user interface of the first application, and objects of the home screen may also have a priority over objects the first user interface, thus, the objects of the home screen may be interactable with a user, but the objects of the first user interface may be not interactable with the user but only displayed through the home screen. For example, icons or shortcuts of applications in the home screen may have a priority over the first user interface, which allows the user to select the icons or the shortcuts when clicking or touching a position at which the icons or the shortcuts are displayed.

According to an embodiment, the home screen may be displayed transparently. For example, a background of the home screen may be transparent and the first user interface may be displayed through the transparent background of the home screen. According to an embodiment, the first user interface may function as a background of the home screen. According to an embodiment, overall transparency of the home screen may be set to have a preset value, such as 50% of transparency. According to an embodiment, the first user interface may be a bottom layer and the home screen may be a top layer.

According to an embodiment, transparency of a first object in the home screen may be set to have a first preset value such as 0%, and transparency of a second object in the home screen may be set to have a second preset value such as 100%. That is, the first object may be displayed in a normal manner and the second object may be displayed transparently, so the first user interface of the first application may be visible through the transparent second object.

According to an embodiment, the second object may include a background of the home screen, and the first user interface may function as the background of the home screen or replace the background of the home screen. According to an embodiment, the second object may include a widget of the home screen for displaying additional information, and the first user interface may be displayed through the transparent widget of the home screen. According to an embodiment, the first object may include icons or shortcuts of applications of the electronic device, and a part of the first user interface which is covered by the first object may not be visible through the first object. According to an embodiment, the first object may include a widget of the home screen for displaying additional information, and the first user interface may be not visible through the widget of the home screen. According to an embodiment, the second preset value may be greater than the first preset value, and the first user interface is more visible through the second object than through the first object.

According to an embodiment, transparency of a background of the home screen may be set to have a preset value, such as 100% of transparency, so the first user interface may be visible through the transparent background of the home screen.

According to an embodiment, a second application may be executed in response to a received user interaction for the second application (hereinafter, referred to as "second user interaction"), and a user interface of the second application (hereinafter, referred to as "second user interface) may be displayed by superimposing the second user interface of the second application on the first user interface of the first application. Therefore, the first user interface may be visible through the second user interface on the screen of the electronic device. It should be understood that because the home screen or the second user interface of the second application is displayed at a top layer, an interaction may be performed on the home screen or the second user interface which are displayed at the top layer, and contents of the second user interface may be updated in real time or played. The first user interface is displayed at a bottom layer, an interaction may not be performed on the first user interface or a portion of the first user interface that is covered or hidden by a non-transparent part of the home screen or the second user interface, and contents of the first user interface may be updated in real time or played and visible through a transparent part of the home screen or the second user interface FIGS. 4 and 5 illustrate examples of displayed first user interfaces, according to an embodiment of the disclosure.

Figure 4:
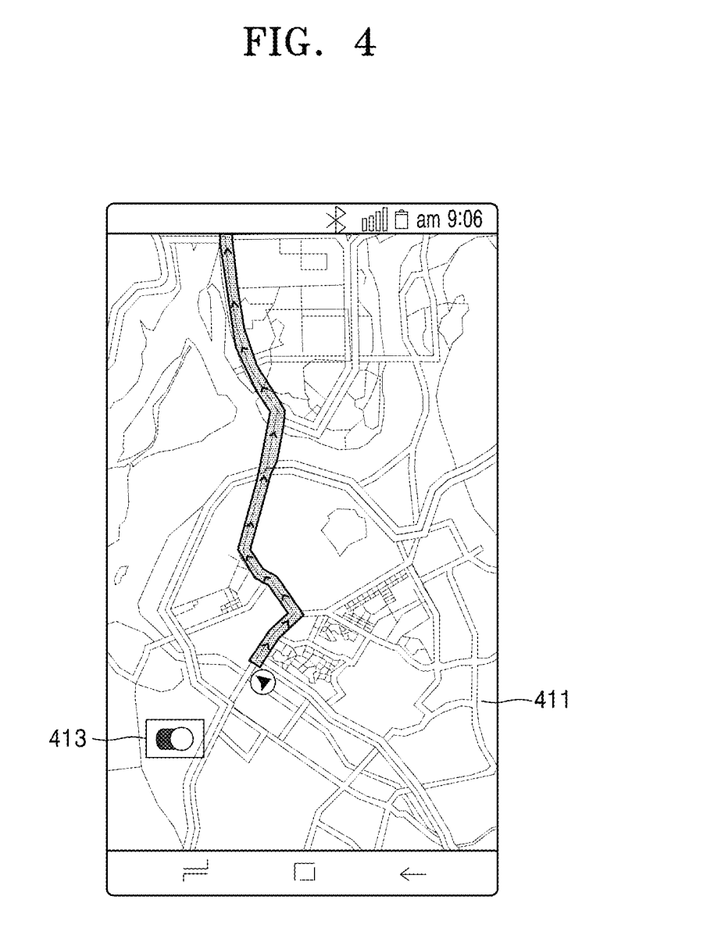
FIGS. 4 and 5 illustrate examples of displayed first user interfaces of a map application, according to an embodiment of the disclosure.
Figure 5:
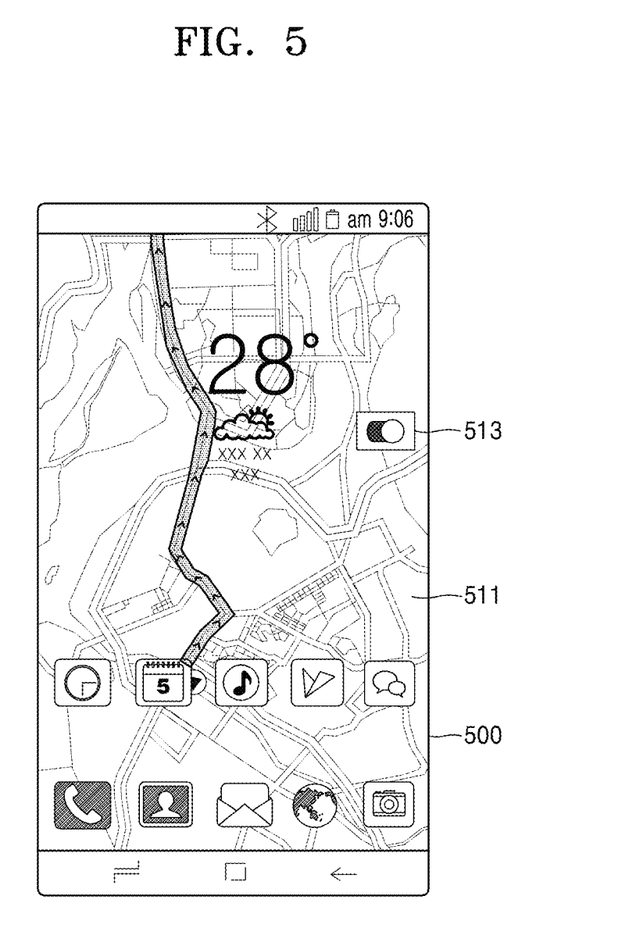

Referring to FIG. 4 and FIG. 5, when receiving a user interaction of turning on a toggle button 413 of the immersive mode floating over the currently displayed first user interface 411, a home screen 500 may be displayed by superimposing the home screen 500 on the first user interface 511. According to an embodiment, the first user interface 511 may function as a background of the home screen 500, and visible while navigating each page of the home screen 500. The first user interface 511 may be displayed fixedly while each page of the home screen is displayed in rotation.

According to an embodiment, the home screen 500 or the second user interface of the second application may be transparently displayed in various suitable ways such that contents of the first user interface may be visible through the home screen 500 or the second user interface. The contents of the first user interface 511 may be only visible through a transparently displayed part of the home screen 500 or the second user interface such as their backgrounds.

According to an embodiment, overall transparency of the home screen 500 or the second user interface may be set to have a first preset value such as 50% of transparency. As another example, transparency of a predetermined object of the home screen 500 or the second user interface may be set to have a second preset value, such as 0% of transparency, and transparency of a portion of the home screen 500 or the second user interface other than the predetermined object may be set to have a third preset value, such as 100% of transparency. As an example, the second preset value may be less than the third preset value. Referring to FIG. 5, the predetermined object may be an icon or a shortcut of the home screen 500, and selectable when clicking or touching a position at which the predetermined object is displayed. The first user interface 511 may be visible through an area having 100% of transparency and not visible through an area having 0% of transparency.

It should be understood that when the first user interface of the first application is displayed by superimposing the home screen or the second user interface of the second application, an area for displaying the first user interface may be identical to an area for displaying the home screen or the second user interface.

According to an embodiment, the first user interface may be maximized for display or displayed in full screen. The home screen or the second user interface may be maximized for display or displayed in full screen.

According to an embodiment, when a user interaction for quitting of the immersive mode of the first user interface is received, an original background of the home screen may be displayed instead of the first user interface.

FIGS. 6, 7, 8 and 9 illustrate examples of displayed first user interfaces, according to an embodiment of the disclosure.

Figure 6:
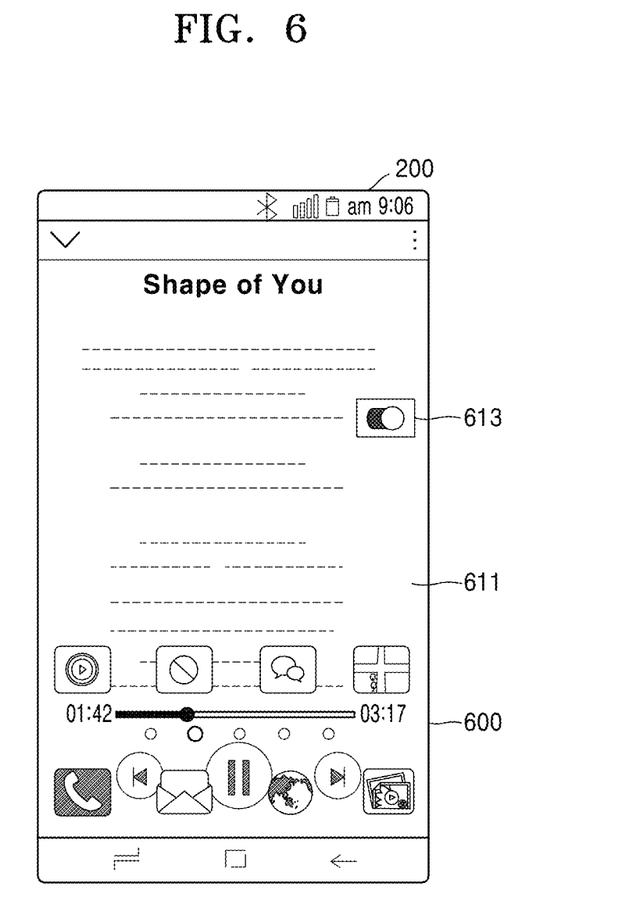
FIG. 6 illustrates an example home screen which is superimposed on a user interface of a music application, according to an embodiment.
Figure 9:
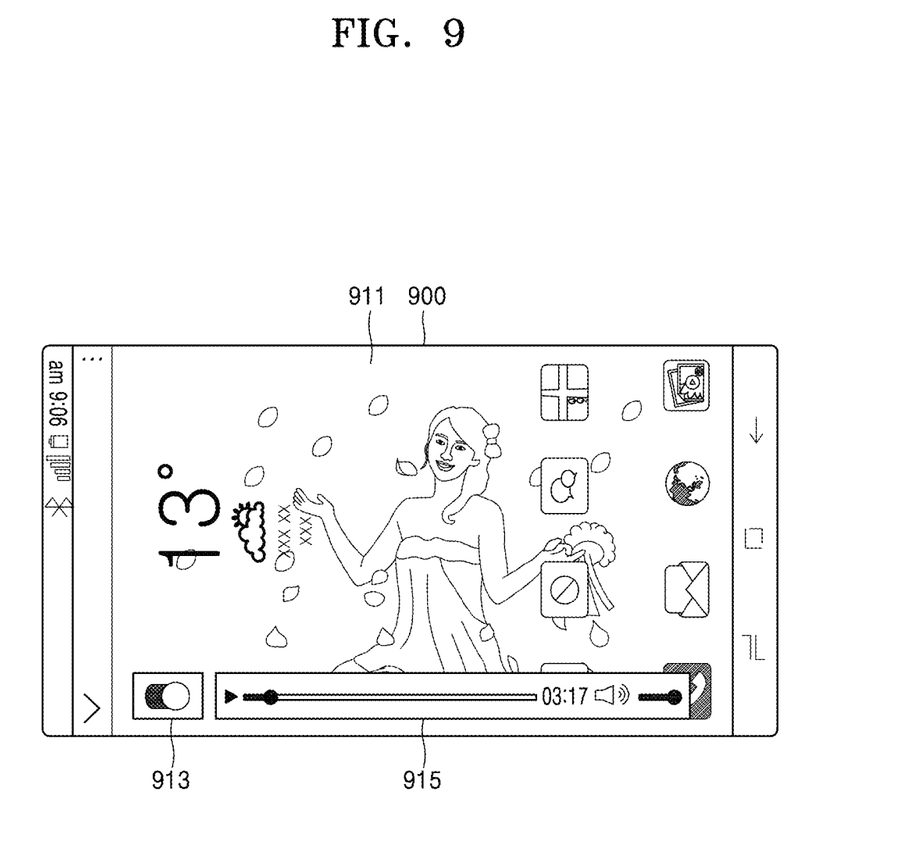
FIG. 9 illustrates an example home screen which is superimposed on a user interface of a video application, according to an embodiment.

When the first user interface is a user interface that requires less interaction (e.g., a navigation interface 511 of a map application, a play interface 611 or 911 of a multimedia playback application, etc.), usefulness of embodiments of the disclosure may increase, because it is common that users merely watch the navigation interface or the play interface without an interaction.

FIG. 6 illustrates an example home screen which is superimposed on a user interface of a music application, according to an embodiment.

Referring to FIG. 6, a home screen 600 may superimpose on a user interface 611 of a music application, and the user interface 611 may be visible through a transparent area of the home screen 600. The user interface 611 may function as or replace a background of the home screen 600, and a toggle button 613 for switching between an immersive mode and a normal mode may be displayed. According to an embodiment, the home screen 600 may superimpose on the user interface 611 in the immersive mode.

Referring to FIG. 6, lyrics of songs in the user interface 611 are visible through the home screen 600, which allows users to use the music application seamlessly and manipulate his electronic device while watching the played lyrics of songs.

Figure 7:
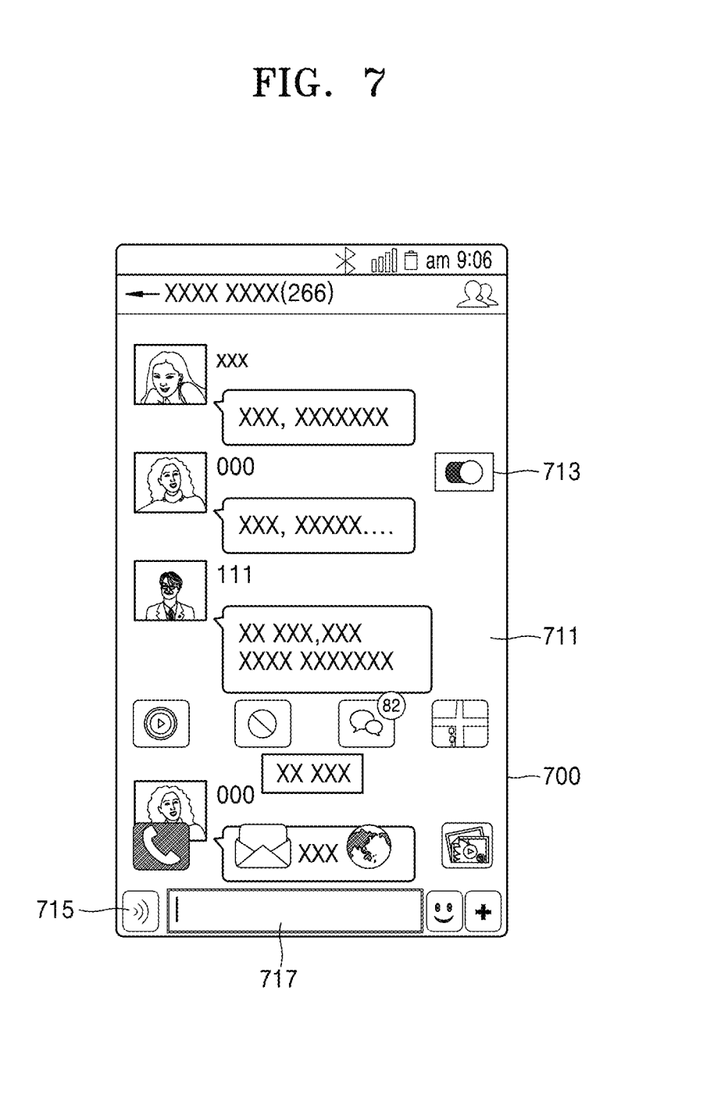
FIG. 7 illustrates an example home screen which is superimposed on a user interface of a message application, according to an embodiment.

FIG. 7 illustrates an example home screen which is superimposed on a user interface of a message application, according to an embodiment.

Referring to FIG. 7, a home screen 700 may superimpose on a user interface 711 of a message application, and the user interface 711 may be visible through a transparent area of the home screen 700. The user interface 711 may function as or replace a background of the home screen 700, and a toggle button 713 for switching between an immersive mode and a normal mode may be displayed. According to an embodiment, the home screen 700 may superimpose on the user interface 711 in the immersive mode.

According to an embodiment, objects 715 and 717, such as buttons, in the user interface 711 may be displayed on the superimposed home screen 700. The objects 715 and 717 may be interactable and may respond to a selection by a touch of a user. According to an embodiment, when the objects 715 and 717 are selected, their corresponding function may be performed. For example, the electronic device may record the user's voice while a user holds a touch on the object 715, and transmit the recorded voice upon a release of the touch. The electronic device may prompt a text input field on the home screen 700 when the object 717 is selected.

Referring to FIG. 7, messages in the user interface 711 are visible through the home screen 700, which allows users to use the message application seamlessly and manipulate his electronic device while watching the messages updated in real-time.

Figure 8:
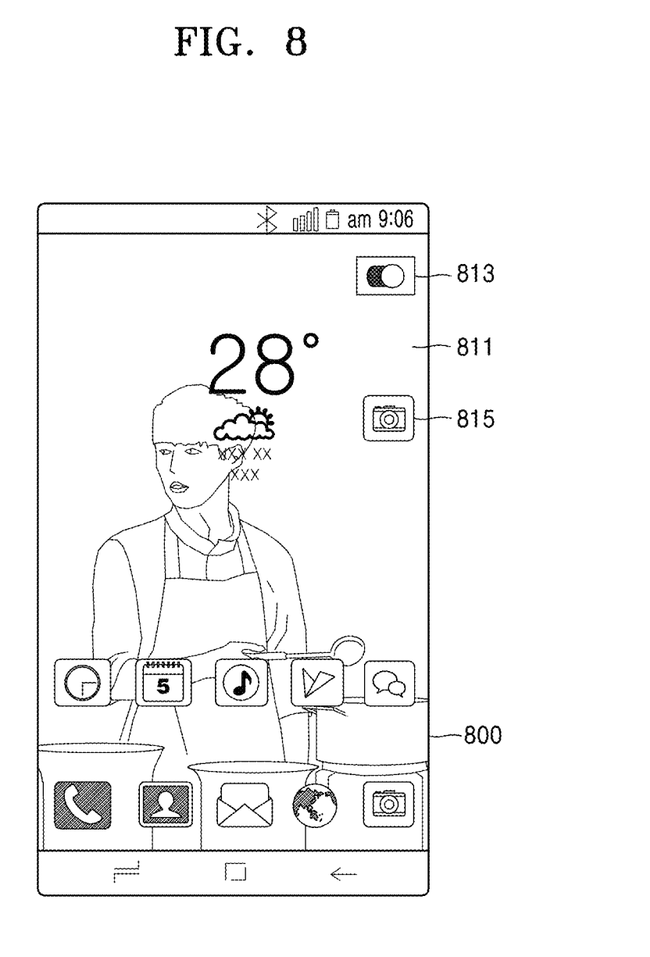
FIG. 8 illustrates an example home screen which is superimposed on a user interface of a camera application, according to an embodiment.

FIG. 8 illustrates an example home screen which is superimposed on a user interface of a camera application, according to an embodiment.

Referring to FIG. 8, a home screen 800 may superimpose on a user interface 811 of a camera application, and the user interface 811 may be visible through a transparent area of the home screen 800. The user interface 811 may function as or replace a background of the home screen 800, and a toggle button 813 for switching between an immersive mode and a normal mode may be displayed. According to an embodiment, the home screen 800 may superimpose on the user interface 811 in the immersive mode.

According to an embodiment, the user interface 811 may be a preview screen of the camera application, and images via a lens of the electronic device may be displayed through the user interface 811 which is visible through the home screen 800.

According to an embodiment, an object 815, such as a capture button, in the user interface 811 may be displayed on the superimposed home screen 800. The object 815 may be interactable and may respond to a selection by a touch of a user. According to an embodiment, when the object 815 is selected, its corresponding function may be performed. For example, the electronic device may capture by its camera in response to a touch on the object 815.

Referring to FIG. 8, a preview screen in the user interface 811 is visible through the home screen 800, which allows users to use the camera application seamlessly and manipulate his electronic device while waiting for a moment to capture.

FIG. 9 illustrates an example home screen which is superimposed on a user interface of a video application, according to an embodiment.

Referring to FIG. 9, a home screen 900 may superimpose on a user interface 911 of a video application, and the user interface 911 may be visible through a transparent area of the home screen 900. The user interface 911 may function as or replace a background of the home screen 900, and a toggle button 913 for switching between an immersive mode and a normal mode may be displayed. According to an embodiment, the home screen 900 may superimpose on the user interface 911 in the immersive mode.

According to an embodiment, the user interface 911 may be a player interface of the video application, and video may be played through the user interface 911 which is visible through the home screen 900.

According to an embodiment, an object 915, such as a media control button, in the user interface 911 may be displayed on the superimposed home screen 900. The object 915 may be interactable and may respond to a selection by a touch of a user. According to an embodiment, the electronic device may control playing video based on inputs on the object 915.

Referring to FIG. 9, a video played in the user interface 911 is visible through the home screen 900, which allows users to watch the video seamlessly and manipulate his electronic device without interruption.

Figure 10:
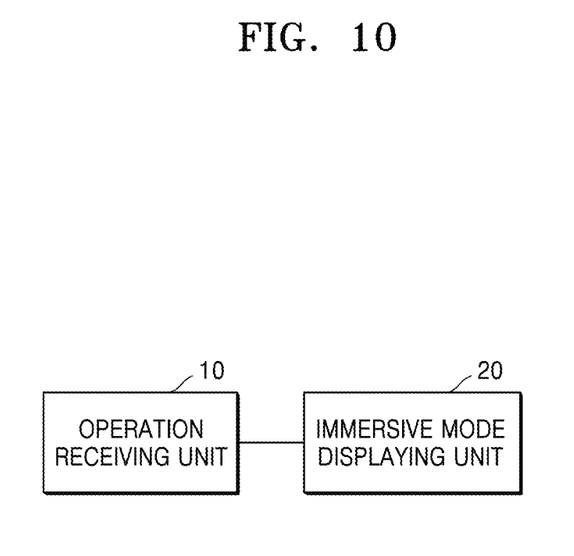
FIG. 10 illustrates a block diagram of an apparatus for displaying a user interface of an application, according to an embodiment of the disclosure.

FIG. 10 illustrates a block diagram of an apparatus for displaying a user interface of an application, according to an embodiment;

As shown in FIG. 10, the apparatus for displaying a user interface of an application according to an embodiment may include: an interaction receiving unit 10 and an immersive mode displaying unit 20. The interaction receiving unit 10 and the immersive mode displaying unit 20 may be implemented by a processor of the apparatus.

The interaction receiving unit 10 may be used for receiving a first user interaction for performing immersive display of a first user interface of a first application.

As an example, the first user interaction for performing the immersive display of the first user interface may include: a user interaction for opening an application to which the first user interface belongs in an immersive display mode; and/or, a user interaction for performing the immersive display of the first user interface which is active.

The immersive mode displaying unit 20 may be used for performing the immersive display of the first user interface in response to the first user interaction, wherein when performing the immersive display of the first user interface, the first user interface and a home screen or a second user interface of a second application are displayed in a superimposing manner, wherein the first user interface may be displayed at a bottom layer and the home screen or the second user interface may be displayed at a top layer, and the home screen or the second user interface may include an area transparently displayed such that contents of the first user interface is visible through the transparently displayed area of the home screen or the second user interface.

As an example, the immersive display unit 20 may cause the home screen or the second user interface to be transparently displayed by: setting overall transparency of the home screen or the second user interface to have a first preset value; setting transparency of a predetermined control of the home screen or the second user interfaces to have a second preset value, and setting transparency of a portion of the home screen or the second user interface other than the predetermined control to have a third preset value; or removing or replacing with the first user interface a wallpaper of the home screen or the second user interface.

As an example, when the immersive display of the first user interface is performed, an area for displaying the first user interface may be identical to an area for displaying the home screen or the second user interface.

According to an embodiment, if the first user interface of the first application is active when the first user interaction is received, the immersive mode displaying unit 20 may bring a home screen or a last active user interface except for user interfaces of the first application to the top layer.

As an example, when performing the immersive display of the first user interface, the immersive mode displaying unit 20 may display at least a part of controls of the first user interface in a floating manner.

As an example, when a user interaction for quitting of the immersive display of the first user interface is received, the immersive mode displaying unit 20 may stop superimposing the home screen or the second user interface on the first user interface.

It should be understood that the specific implementation of the apparatus for displaying a user interface of an application according to embodiments may be implemented by referring to the related specific implementations described in conjunction with FIGS. 1 to 9, and redundant details are not described herein again.

A computer readable storage medium storing a computer program that, when executed by a processor, implements the method of displaying a user interface of an application described in the above embodiments, according to an embodiment.

An electronic terminal according to an embodiment includes: a processor (not shown) and a memory (not shown), wherein the memory stores a computer program, and when the computer program is executed by the processor, the method of displaying the user interface of the application described in the above embodiments may be carried out.

Moreover, it should be understood that various units in the apparatus for displaying the user interface of the application according to an embodiment may be implemented as hardware components and/or software components. Those skilled in the art can implement the various units, for example, using a Field Programmable Gate Array (FPGA) or an Application Specific Integrated Circuit (ASIC), depending on the processing performed by the various defined units.

Further, the method of displaying the user interface of the application according to an embodiment may be implemented as computer codes in a computer readable recording medium. The computer code can be implemented by those skilled in the art according to the description of the above methods. The above methods of the disclosure are carried out when the computer code is executed in a computer.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a memory storing instructions; and
at least one processor configured to execute the instructions to:
display a home screen on a screen of the electronic device,
in response to receiving a first user interaction for a first application of the electronic device, execute the first application in the electronic device, wherein the first user interaction comprises selection of a toggle button of an immersive display mode of the first application, and
display a first user interface of the first application by superimposing the home screen on the first user interface, wherein the first user interface or the home screen comprises the toggle button, and wherein the superimposing is associated with setting of transparency preset value,
wherein the first application continues executing and the first user interface is visible through the home screen on the screen of the electronic device while the home screen is superimposed on the first user interface, and
wherein at least one user-interactable object for the first user interface is displayed on the superimposed home screen while at least one object for the home screen is also user-interactable.

2. The electronic device of claim 1, wherein a background of the home screen is transparently displayed, and the first user interface is visible through the transparently displayed background of the home screen.

3. The electronic device of claim 1, wherein a background of the home screen is transparently displayed by setting transparency of the background of the home screen to have a preset value.

4. The electronic device of claim 1, wherein the first user interface is displayed through an area on the screen of the electronic device, and the home screen is displayed in a same area.

5. The electronic device of claim 1, wherein the first application is a camera application, and the at least one user-interactable object of the first user interface comprises a capture button.

6. The electronic device of claim 1, wherein the first application is a media player application, and the at least one user-interactable object of the first user interface comprises a media control button.

7. The electronic device of claim 1, wherein the first user interaction comprises: selection of a toggle button of an immersive display mode of the first application.

8. The electronic device of claim 7, wherein the first user interface or the home screen comprises the toggle button.

9. The electronic device of claim 1, wherein the first user interaction comprises at least one of selection of an option displayed in the home screen to execute the first application, and selection of an option displayed in the first application to move to the home screen.

10. The electronic device of claim 1, wherein the first user interface of the first application is displayed as a background of the home screen.

11. The electronic device of claim 1, wherein the home screen comprises a plurality of pages and the first user interface of the first application is visible through the home screen while navigating the plurality of pages of the home screen.

12. The electronic device of claim 11, wherein the first user interface of the first application is displayed fixedly while the plurality of pages of the home screen are displayed in rotation.

13. The electronic device of claim 1, wherein the at least one processor is further configured to execute the instructions to update and display contents in the first user interface of the first application.

14. The electronic device of claim 1, wherein contents are played in the first user interface of the first application.

15. A method, comprising:
displaying a home screen on a screen of an electronic device;
in response to receiving a first user interaction for a first application of the electronic device, executing the first application in the electronic device, wherein the first user interaction comprises selection of a toggle button of an immersive display mode of the first application; and
displaying a first user interface of the first application by superimposing the home screen on the first user interface, wherein the first user interface or the home screen comprises the toggle button, and wherein the superimposing is associated with setting of transparency preset value,
wherein the first application continues executing and the first user interface is visible through the home screen on the screen of the electronic device while the home screen is superimposed on the first user interface, and
wherein at least one user-interactable object for the first user interface is displayed on the superimposed home screen while at least one object for the home screen is also user-interactable.

16. A non-transitory computer readable recording medium having stored thereon instructions, which when executed, cause at least one processor to:
initiate display of a home screen on a screen of an electronic device;
in response to receiving a first user interaction for a first application of the electronic device, execute the first application in the electronic device, wherein the first user interaction comprises selection of a toggle button of an immersive display mode of the first application; and initiate display of a first user interface of the first application by superimposing the home screen on the first user interface, wherein the first user interface or the home screen comprises the toggle button, and wherein the superimposing is associated with setting of transparency preset value, wherein the first application continues executing and the first user interface is visible through the home screen on the screen of the electronic device while the home screen is superimposed on the first user interface, and wherein at least one user-interactable object for the first user interface is displayed on the superimposed home screen while at least one object for the home screen is also user-interactable.

* * * * *